United States Patent [19]

Volz

[11] 4,362,414
[45] Dec. 7, 1982

[54] QUICK RELEASE CONNECTOR ASSEMBLY

[76] Inventor: Fritz Volz, 8020 Denrock Ave., Los Angeles, Calif. 90045

[21] Appl. No.: 244,190

[22] Filed: Mar. 16, 1981

[51] Int. Cl.³ .............................................. F16B 7/20
[52] U.S. Cl. ...................................... 403/24; 403/349
[58] Field of Search ............. 24/221 R; 403/349, 348, 403/24

[56] References Cited

U.S. PATENT DOCUMENTS

| | | | |
|---|---|---|---|
| 942,330 | 12/1909 | Jones et al. | 24/221 R UX |
| 1,294,304 | 2/1919 | Pittman | 403/349 X |
| 2,187,426 | 1/1940 | Kuhnel | 24/221 K |
| 2,356,162 | 8/1944 | Johnson et al. | 24/221 A |
| 3,743,147 | 7/1973 | Wilczynski | 24/221 R X |

*Primary Examiner*—Andrew V. Kundrat
*Attorney, Agent, or Firm*—Fischer, Tachner & Strauss

[57] ABSTRACT

A connector assembly by which a user may detachably connect a tool (e.g. a flashlight, a screwdriver, or a chemical spray container) or a tool holder to a wall or to an article of clothing, such as a belt, or the like. The instant connector assembly comprises a hollow recepticle member, which may be interfaced with the user's clothing, and a plug member, which is interfaced with the tool or tool holder. The front face of the recepticle member is provided with an entry slot, through which the plug member is inserted. The underside of the front face is provided with a drop slot or groove, into which the plug member can be seated. Ramp portions are formed between the entry and drop slots for reliably guiding the plug member from the entry slot into engagement with the drop slot. The recepticle member also includes a slideable locking plate located therewithin. The plate is spring-biased, so as to be adapted for movement into contact with the plug member to thereby prevent the plug member from becoming accidentally unseated from the drop slot. Sufficient force may be exerted on the plug member in order to move the locking plate against the bias of the spring and, accordingly, permit the plug member to be removed from the drop slot, whereby to detach the plug member from the recepticle member via the entry slot.

8 Claims, 6 Drawing Figures

QUICK RELEASE CONNECTOR ASSEMBLY

BACKGROUND OF THE INVENTION

1. Field of the Invention

This invention relates to a connector assembly comprising receptacle and plug members that may be reliably attached to or quickly disconnected from one another. The invention has particular application as a quick release connector assembly by which a user may detachably connect a tool or tool holder to an article of his clothing or the wall of a workroom.

2. Prior Art

It is often desirable for a tool to be carried near the body of a user, while the user's hands are free to be employed in the performance of a particular job. The tool should not interfere with the user but must be readily accessible to the user in the course of his job. By way of a first example, a workman may wish to conveniently carry a holder unit containing one or more of a flashlight, a hammer, a screwdriver, and the like. By way of a second example, a police officer may wish to safely carry a holster unit containing a self-protective device, such as a chemical spray container, a baton, or the like. In a third example, a person may wish to easily transport a portable radio or camera while engaged in an activity out of doors.

In each of the aforementioned examples, the respective tools must be reliably connected at the user's body to avoid undesirable loss thereof in the event that the user is subjected to a turbulent or contact environment. Moreover, the user must be provided with quick and easy access to the tool, should the user be presented with an emergency situation, when a rapid deployment of the tool is required.

There are known connector assemblies available in which component parts thereof are detachable connected to one another for securing a tool, or the like, near the body of a user. Examples of such conventional connector assemblies may be found in the following U.S. patents.

| Pat. No. | Issue Date |
|---|---|
| 1,796,987 | March 17, 1931 |
| 2,280,304 | April 21, 1942 |
| 4,216,567 | August 12, 1980 |

However, many conventional connector assemblies are not adapted to conveniently attach a tool, a tool holder, or the like, close to the body of a user (such as at an article of the user's clothing), so that the tool is readily accessible to the user. Moreover, other connector assemblies are relatively cumbersome to operate and frequently require the use of two hands when connecting or detaching components of the assembly. These connector assemblies are not suitable for employment by a user who could be exposed to an emergency or other difficult situation, where one free hand and a rapid detachment of the connector parts (by the second hand) are simultaneously required. What is more, still other of the conventional connector assemblies may become undesirably detached in the event that the user is severely jostled. As a result, the tool could either be lost or removed by an unauthorized individual.

SUMMARY OF THE INVENTION

Accordingly, it is one object of the present invention to provide a quick release connector assembly by which a user may detachably connect a tool, a tool holder, or the like, to a wall or to an article of his clothing, such as, for example, a belt.

It is another object of this invention to provide a connector assembly which comprises complementary receptacle and plug members that may be reliably interconnected with one another, so as to prevent an accidental disconnection thereof in the event that the user is severely jostled.

It is still another object of this invention to provide the aforementioned receptacle member with a horizontal entry slot and a vertical drop slot, so that the plug member may be received through the entry slot and seated within the drop slot, whereby to form a reliable interconnection between the plug and receptacle members.

It is a further object of this invention to provide the receptacle member with ramp portions extending between the aforementioned entry and drop slots, so that the plug member can be easily rotated along the ramp portion and guided from the entry slot into engagement with the drop slot.

It is yet an additional object of this invention to provide within the receptacle member a slideable locking plate that is spring biased into contact with the plug member, so as to prevent an unintentional or unauthorized removal of the plug member from the drop slot of the receptacle member.

BRIEF DESCRIPTION OF THE DRAWINGS

The present invention may be more readily described by reference to the accompanying drawings in which.

DESCRIPTION OF THE PREFERRED EMBODIMENT

Figure 1:
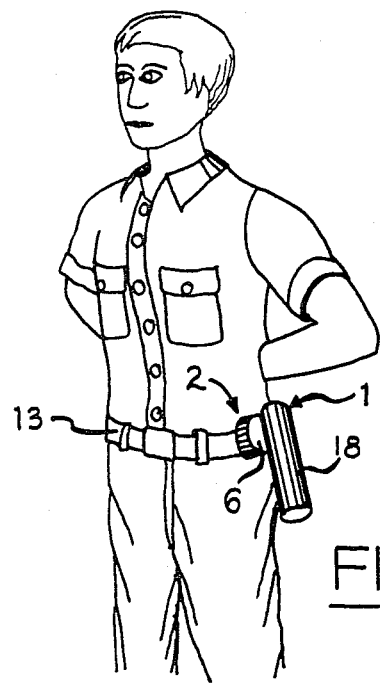
FIG. 1 shows the connector assembly of the present invention for detachably securing a holder unit to the belt of a user.
Figure 2:
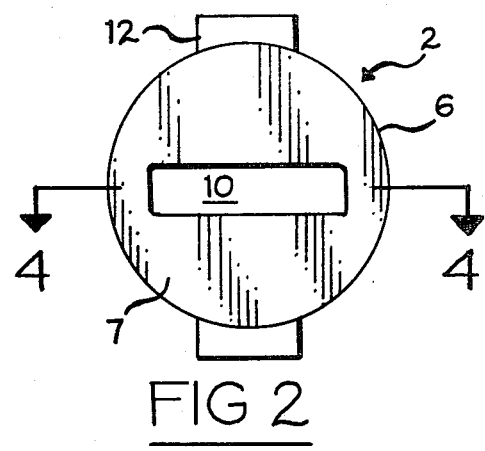
FIG. 2 is a front view of the receptacle member which forms a first component part of the connector assembly of the present invention.

The quick release connector assembly of the present invention is disclosed in detail while referring to the drawings. The connector assembly 1 includes a receptacle member 2 (best shown in FIG. 2) and a plug member 4 (best shown in FIG. 3). Referring more particularly to FIG. 2 of the drawings, the receptacle 2 comprises a hollow cylinder or disk-shaped housing 6 that is typically fabricated from a hard and durable plastic material. A horizontally aligned entry slot or opening 10 is formed through a circular cap or face portion 7 which is secured at the front end of housing 6. As will be disclosed in greater detail hereinafter, the (e.g. rectangular) dimensions of entry slot 10 are selected so that the plug member 4 may be accommodated therethrough. The rear end of housing 6 has connected thereto a clip 12 of conventional design. The clip 12 may be fabricated from a suitably flexible material, such as stainless steel or aluminum. By way of example, and as is best illustrated in FIG. 1 of the drawings, the receptacle member 2 may be removably attached to an article of the user's clothing by means of clip 12. In the example of FIG. 1, clip 12 removably attaches receptacle member 2 to the belt 13 of the user. However, the article of the user's clothing to which receptacle member 2 is attached is not to be considered a limitation of the present invention. Hence, it is to be understood that the present receptacle member 2 may also be removably attached to the user's belt loop, pocket, coat, or the like.

Figure 3:
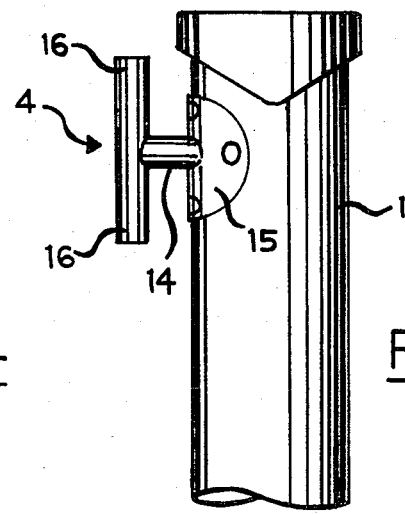
FIG. 3 illustrates a side view of the plug member which forms the second component part of the present connector assembly, the plug member being connected to a holder unit.

Referring to FIG. 3 of the drawings, the plug member 4 of connector assembly 1 is now described in detail. Plug member 4 includes a shank 14. One end of shank 14 is connected to a plate 15, or the like. Plate 15 is secured to a well-known holder unit 18. The holder unit 18 may contain a tool or other article (not shown) which, by means of the present connector assembly, can be conveniently and unobtrusively carried near the body of the user. By way of example, a flashlight, a hammer, a chemical (e.g. tear gas) spray container, or the like, may be received in and transported by holder unit 18. The second end of shank 14 has a head portion formed thereat which preferably comprises a plurality (e.g. two) of solid, cylindrical arms 16. Typically, the arms 16 of plug member 4 have dimensions which correspond generally with those of the entry slot 10. Moreover, and to improve stability, the diameter of each arm 16 is approximately equal to the length of shank 14. However, the number and configuration of the arms 16 of plug member 4 are also not to be regarded as a limitation of the present invention. Arms 16 extend outwardly from shank 14 in opposite directions from one another. Thus, as is best shown in the example of FIG. 3, the plug member 4 comprises a T-shaped component part of the present connector assembly.

Figure 4:
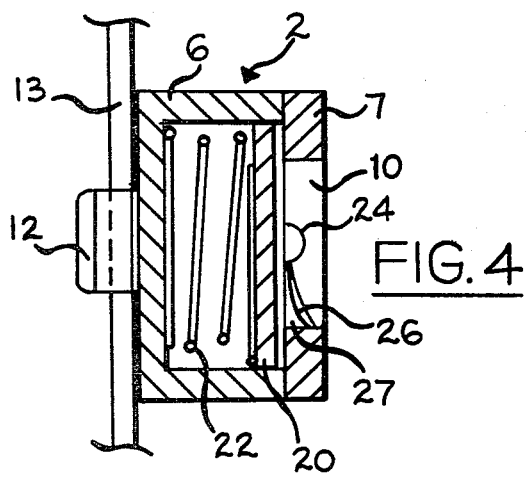
FIG. 4 is a cross-sectional view of the receptacle member taken along lines 4—4 of FIG. 2.

The interior structure of the hollow, disk-shaped housing 6 of receptacle member 2 is best disclosed when referring to FIG. 4. As was previously disclosed, housing 6 includes an entry slot 10 formed through the front face portion 7 thereof. The interior of housing 6 is provided with a sliding locking plate 20 and a spring 22. In a preferred embodiment of the invention, locking plate 20 has a circular configuration and a diameter which is slightly less than that of the interior of housing 6. Spring 22 is preferably a helical compression spring that is positioned within the interior of housing 6 between the rear end of housing 6 and the locking plate 20 in order to control the movement of plate 20 through the interior of the housing. In the assembled relationship of FIG. 3, the spring 22 acts to bias locking plate 20 at a position immediately behind the underside of the front face portion 7 of housing 6.

Figure 6:
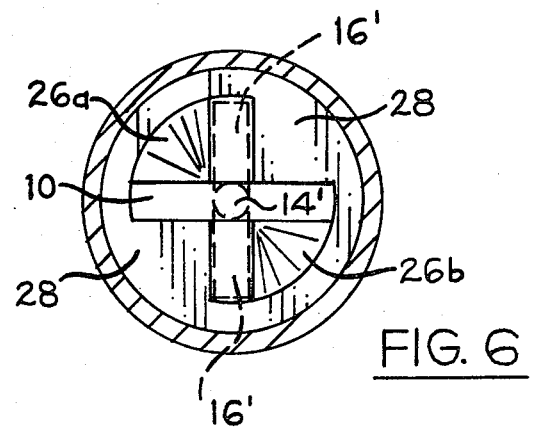
FIG. 6 illustrates the underside of the front face portion of the receptacle member of FIG. 2.

In accordance with an important advantage of the present invention, the underside of front face portion 7 is provided with a unique structure by which to increase both the reliability and ease in which plug member 4 may be detachably connected to receptacle member 2. The underside of front face portion 7 is illustrated in FIG. 6 of the drawings. As was previously disclosed, the horizontal entry slot 10, forms an opening in housing 6 through which plug member 4 may be inserted for connection with receptacle member 2. A verticle groove or drop slot 24 is formed (e.g. cut or molded) in the underside of front face portion 7, so as to be arranged in a substantially perpendicular alignment with horizontal entry slot 10. Drop slot 24 is particularly shaped so as to be adapted to form a seat for receiving therein the arms 16 of plug member 4.

A pair of identical sloping or ramped portions 26a and 26b are also formed in the underside of front face portion 7. More particularly, a first ramp portion 26a comprises an inclined surface that extends between one side of the horizontal entry slot 10 and the top end of the vertical drop slot 24. The second ramp portion 26b comprises an inclined surface that extends between the other side of entry slot 10 and the bottom end of drop slot 24. Hence, the pair of ramp portions 26a and 26b are arranged in diagonally opposing alignment relative to one another. As will be disclosed in greater detail hereinafter, when plug member 4 is inserted through entry slot 10, ramp portions 26a and 26b function to guide the respective arms 16 thereof from entry slot 10 into the seat formed by drop slot 24. To ensure that plug member 4 will be properly guided into the seat of drop slot 24, the ramp portions 26a and 26b are formed slightly below the underface of front portion 7, so that tapering guide ridges 27 (best shown in FIGS. 4 and 5) are created above each ramp portion 26a and 26b. Positioned opposite each one of the pair of ramp portions 26a and 26b (and adjacent drop slot 24) is a respective stop portion 28. Stop portions 28 are aligned flush with the underface of front portion 7. Therefore, stop portions 28 are elevated slightly above each of the ramp portions 26a and 26b. The stop portions 28 function to prevent the arms 16 of plug member 4 from being moved beyond drop slot 24 when plug member 4 is guided thereto via the inclined surfaces of ramp portions 26a and 26b.

Figure 5:
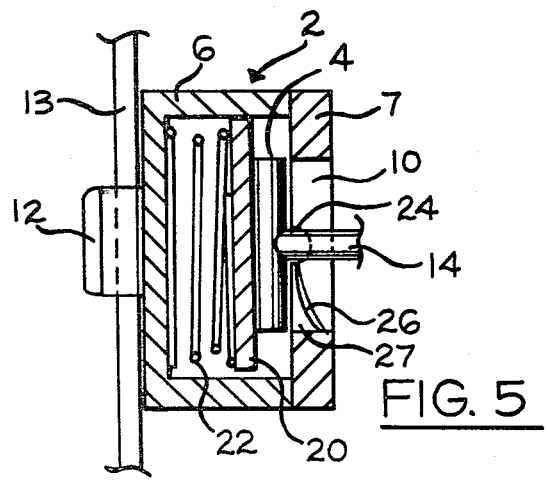
FIG. 5 illustrates the cross-sectional view of the receptacle member of FIG. 4 with the inclusion therewithin of the plug member of FIG. 3.

The operation of the connector assembly which forms the present invention is best described while referring concurrently to FIGS. 4–6 of the drawings. When the instant connector assembly is in the detached condition (best shown in FIG. 4), the spring 22 within the hollow housing 6 of receptacle member 2 biases sliding locking plate 20 against the underside of front face portion 7. In order to detachably connect member 4 to receptacle member 2 (whereby to attach a holder member 18 to an article of the user's clothing), the arms 16 of plug member 4 are (i.e. horizontally) aligned for insertion through the horizontal entry slot 10 formed through the front face portion 7. The insertion of plug member 4 through entry slot 10 results in the contact of plug member 4 with locking plate 20 and the compression of spring 22. Locking plate 20 is thereby moved away from front face portion 7 (best shown in FIG. 5). Accordingly, the user can rotate the holder unit, whereupon to cause the arms 16 of plug member 4 to be correspondingly rotated up the inclined surfaces of respective ramp portions 26a and 26b from the horizontal to the vertical position, until the arms 16 of plug member 4 become seated within the drop slot 24. The position of the shank and arms (designated by reference numerals 14' and 16' and shown in phantom) of plug member 4 when seated within the vertically aligned drop slot 24 is illustrated in FIG. 6. Hence, in the attached condition (i.e. when plug member 4 is seated within the drop slot 24 of receptacle member 2), spring 22 returns to a substantially relaxed condition, whereby to move locking plate 20 into contact with the arms 16 of plug member 4. Thus, the force exerted by locking plate 20 against the plug member 4 reliably prevents the arms 16 thereof from moving out of engagement with drop slot 24. Therefore, the plug member 4 is reliably retained within recepticle member 2, so as to substantially prevent an accidental or unauthorized detachment therefrom. Accordingly, the connector assembly which forms the present invention is especially advantageous for preventing the undesirable removal of the holder unit in the event that the user is either jostled or located within a crowded or a contact environment.

When it is desirable to disconnect plug member 4 from recepticle member 2, the user exerts sufficient force upon the holder unit, whereby to depress plug member 4 against plate 20 so that the arms 16 of plug member 4 are moved out of engagement with the drop slot 24. Accordingly, plate 20 is moved away from the underside of front face portion 7, so as to compress spring 22. The user can then rotate the holder unit, whereupon to cause the arms 16 of plug member 4 to be correspondingly rotated down the inclined surfaces of respective ramp portions 26a and 26b from the vertical to the horizontal position, until plug member 4 is aligned with horizontal entry slot 10. The stop portions 28 prevent the arms 16 of plug member 4 from being rotated beyond the desired alignment with entry slot 10, so as to facilitate the disconnection of plug member 4 from recepticle member 2. Accordingly, the plug member 4 can be withdrawn from recepticle member 2 through the entry slot 10, so that, by employing a single hand, the user may gain quick and easy access to the tool or the holder associated therewith.

It will be apparent that while a preferred embodiment of the invention has been shown and described, various modifications and changes may be made without departing from the true spirit and scope of the invention. By way of one example, the plug member 4 of the present connector assembly 1 may be connected directly to a device, such as a portable radio or a camera (by means of a plate 15), whereby to eliminate the necessity of holder unit 18. By way of an additional example, and as will also be recognized by those skilled in the art, the clip 12 may be deleted from the rear end of recepticle member 2, so that recepticle member 2 may be connected (by means of a screw or a suitable adhesive) directly to the surface of a wall. Hence, the user will be able to employ several of the quick release connector assemblies of the present invention in a stationary environment, such as a workshop, a kitchen, a car, an aircraft panel, or the like.

Having thus set forth a preferred embodiment of the present invention, what is claimed is:

1. A detachable connector assembly comprising:
   a plug member connected at one end thereof to an arcuate plate which is secured to a utilization means, the other end of said plug member having an elongated head portion formed thereat parallel to the axis of curvature of said arcuate plate,
   a recepticle member including a hollow housing and a face portion attached to one end of said housing,
   said face portion having an entry opening for receiving therethrough the head portion of said plug member,
   the underside of said face portion which is located at the interior of said housing having a slot formed therein, said slot being spaced from said entry opening and dimensioned to receive and seat the head portion of said plug member when said plug member is inserted through said entry opening and moved into engagement with said slot,
   locking means located within the interior of said housing and being positionable adjacent the underside of said face portion,
   at least one rising surface formed at the underside of said face portion and inclining between said entry opening and one end of said slot for guiding the head of said plug member from said entry opening into receipt by said slot,
   at least one stop portion formed at the underside of said face portion, said stop portion being located adjacent the other end of said slot and extending above said rising surface, so as to prevent the head portion of said plug member from being guided beyond said slot, and
   resilient means located within the interior of said housing for biasing said locking means into contact with the head portion of said plug member, in order to removably connect said utilization means to said recepticle member.

2. The connector assembly recited in claim 1, wherein said utilization means is a tool holder.

3. The connector assembly recited in claim 1, wherein said utilization means is a tool.

4. The connector assembly recited in claim 1, wherein said locking means includes a plate that is slideable through the interior of the housing of said recepticle member, the position of said plate being controlled by said resilient means.

5. The connector assembly recited in claim 1, wherein said resilient means is a spring, said spring being interfaced with said locking means for controlling the position of said locking means within the interior of the housing of said recepticle member.

6. The connector assembly recited in claim 1, wherein the head portion of said plug member includes at least one appendage and a base, said appendage extending outwardly from said base.

7. The connector assembly recited in claim 1, wherein said entry opening and said slot are aligned substantially perpendicular to one another at the underside of said face portion.

8. The connector assembly recited in claim 1, wherein said rising surface is formed completely below the surface of the underside of said face portion, so that a guide ridge is established above said rising surface for directing the head portion of said plug member into receipt by said slot.

* * * * *